United States Patent
Kimura

(10) Patent No.: US 7,580,152 B2
(45) Date of Patent: Aug. 25, 2009

(54) IMAGE PROCESSING APPARATUS AND METHOD AND MEMORY MEDIUM

(76) Inventor: Yoshio Kimura, c/o Canon Kabushiki Kaisha, 30-2, Shimomaruko 3-chome, Ohta-ku, Tokyo (JP)

( * ) Notice: Subject to any disclaimer, the term of this patent is extended or adjusted under 35 U.S.C. 154(b) by 84 days.

(21) Appl. No.: 11/074,635

(22) Filed: Mar. 9, 2005

(65) Prior Publication Data

US 2005/0219582 A1    Oct. 6, 2005

Related U.S. Application Data

(62) Division of application No. 09/200,874, filed on Nov. 27, 1998, now Pat. No. 6,885,474.

(30) Foreign Application Priority Data

Nov. 28, 1997  (JP)  ................................. 9-327467
Nov. 20, 1998  (JP)  ............................... 10-330335

(51) Int. Cl.
*G06F 15/00*  (2006.01)
*G06K 15/02*  (2006.01)
*H04N 1/46*   (2006.01)
*G06F 3/12*   (2006.01)
*G06K 15/10*  (2006.01)

(52) U.S. Cl. ................ 358/1.9; 358/1.2; 358/504; 358/1.13; 358/1.15; 358/1.8

(58) Field of Classification Search .......... 358/1.9, 358/1.15, 1.16, 504, 1.2, 1.8, 1.13; 399/8
See application file for complete search history.

(56) References Cited

U.S. PATENT DOCUMENTS

| | | | |
|---|---|---|---|
| 4,926,268 A | 5/1990 | Kawamura et al. | 358/458 |
| 4,967,283 A | 10/1990 | Uchiyama et al. | 358/296 |
| 5,181,105 A | 1/1993 | Udagawa et al. | 358/80 |
| 5,378,563 A | 1/1995 | Ito | 430/30 |
| 5,434,645 A | 7/1995 | Usami | 355/38 |
| 5,608,549 A | 3/1997 | Usami | 358/530 |
| 5,638,188 A | 6/1997 | Moro et al. | 358/456 |
| 5,748,772 A | 5/1998 | Moro et al. | 382/167 |
| 5,818,960 A * | 10/1998 | Gregory et al. | 358/1.9 |
| 5,838,342 A | 11/1998 | Takahashi et al. | 347/19 |
| 5,950,036 A * | 9/1999 | Konishi | 399/8 |
| 6,043,909 A | 3/2000 | Holub | 358/504 |
| 6,046,820 A | 4/2000 | Konishi | 358/1.9 |

(Continued)

FOREIGN PATENT DOCUMENTS

JP    7288704    10/1995

(Continued)

*Primary Examiner*—Edward L Coles
*Assistant Examiner*—Thomas J Lett
(74) *Attorney, Agent, or Firm*—Fitzpatrick, Cella, Harper & Scinto

(57) ABSTRACT

A printing system which can obtain a print result at a proper quality without a variation in quality from any printer while freely corresponding to a fluctuation of output image characteristics of each printer is provided. A density correction processor obtains correction data to correct the output image characteristics from a printer, forms a density correction table to correct an output density of print information from each data processing apparatus every printer, stores each of the formed density correction tables into a memory medium, and manages them.

4 Claims, 9 Drawing Sheets

U.S. PATENT DOCUMENTS

| | | | |
|---|---|---|---|
| 6,188,486 B1 | 2/2001 | Yamada | 358/1.15 |
| 6,256,111 B1 | 7/2001 | Rijavec | 358/1.9 |
| 6,313,924 B2 | 11/2001 | Kanamori | 358/1.9 |
| 6,351,558 B1 | 2/2002 | Kuwata | 382/168 |
| 6,404,511 B1 * | 6/2002 | Lin et al. | 358/1.9 |
| 6,473,197 B1 * | 10/2002 | Shimazaki | 358/1.9 |
| 6,643,029 B2 | 11/2003 | Kumada et al. | 358/1.9 |
| 2002/0118385 A1 | 8/2002 | Nagashima | 358/1.15 |

FOREIGN PATENT DOCUMENTS

| | | |
|---|---|---|
| JP | 8009158 | 1/1996 |
| JP | 9116768 | 5/1997 |

* cited by examiner

FIG. 3

DENSITY CORRECTION TABLE  TB1

| THEORETICAL DENSITY (OUTPUT TO PRINTER) | INPUT DENSITY (INPUT FROM PRINTER) | DENSITY CORRECTION VALUE |
|---|---|---|
| 10% | D1 | 10 / D1 |
| 20% | D2 | 20 / D2 |
| 30% | D3 | 30 / D3 |
| 40% | D4 | 40 / D4 |
| 50% | D5 | 50 / D5 |
| 60% | D6 | 60 / D6 |
| 70% | D7 | 70 / D7 |
| 80% | D8 | 80 / D8 |
| 90% | D9 | 90 / D9 |
| 100% | D10 | 100 / D10 |

FIG. 4

GRADATION
CORRECTION TABLE      TB2

| THEORETICAL GRADATION VALUE (INPUT GRADATION TO DATA PROCESSOR) | GRADATION CORRECTION VALUE (GRADATION VALUE OUTPUT TO PRINTER) |
|---|---|
| 0 | 0 |
| 1 | (10/D1)/26 |
| 2 | (10/D1)/26×2 |
| 3 | (10/D1)/26×3 |
| 4 | (10/D1)/26×4 |
| 5 | (10/D1)/26×5 |
| . | . |
| 26 | 10/D1 |
| . | . |
| 51 | 20/D2 |
| . | . |
| . | . |
| . | . |
| 230 | 90/D9 |
| . | . |
| 255 | 100/D10 |

FIG. 9

MEMORY MEDIUM
(FD / CD-ROM ETC.)

| DIRECTORY INFORMATION |
|---|
| 1st DATA PROCESSING PROGRAM<br>PROGRAM CODES FOR STEPS EXPLAINED IN FIG. 5 |
| 2nd DATA PROCESSING PROGRAM<br>PROGRAM CODES FOR STEPS EXPLAINED IN FIG. 6 |
| 3rd DATA PROCESSING PROGRAM<br>PROGRAM CODES FOR STEPS EXPLAINED IN FIG. 7 |
| |

MEMORY MAP OF MEMORY MEDIUM

IMAGE PROCESSING APPARATUS AND METHOD AND MEMORY MEDIUM

This application is a divisional application of U.S. application Ser. No. 09/200,874, filed Nov. 27, 1998, now U.S. Pat. No. 6,885,474 now allowed.

BACKGROUND OF THE INVENTION

1. Field of the Invention

The present invention relates to an apparatus for forming correction data of each printer in accordance with color reproducing characteristics of a reference printer.

2. Related Background Art

In a conventional printer of a laser beam system, a visible image is formed by fixing toner onto a paper. In a conventional printer of an ink jet system or a bubble jet system, a visible image is formed by spraying ink onto a paper.

A process and a mechanism for such an image formation is becoming complicated more and more in association with a demand for realization of high resolution and color image formation of a printer in recent years.

In the above conventional apparatus, however, there is a problem such that a visible image deteriorates due to electrical and mechanical factors such as change in environment, abrasion of each part, and the like when the visible image is formed. There is also a problem such that even if the same print data is transmitted, a printed image differs depending on the printer.

Further, although a correcting process for output image characteristics to cope with a quality deterioration of a visible image, namely, a process called a calibration has been executed in some printers, it is insufficient and there is a problem such that only images which is more deteriorated than the desired quality of the user can be obtained.

SUMMARY OF THE INVENTION

The invention is made in consideration of the above problems and it is an object to obtain an output image at a proper quality without a variation in quality from each printer while freely corresponding to a fluctuation in color reproducing characteristics of each printer.

According to the invention, the above object is accomplished by an image processing method comprising the steps of: inputting output characteristics data corresponding to each of a plurality of output apparatuses including a reference output apparatus; and forming correction data corresponding to the other output apparatus on the basis of the output characteristics data of the reference output apparatus and the output characteristics data of the other output apparatus, wherein in association with a revise of the output characteristics data of the reference output apparatus, the correction data corresponding to the other output apparatus is revised on the basis of the revised output characteristics data of the reference output apparatus.

The above and other objects and features of the present invention will become apparent from the following detailed description and the appended claims with reference to the accompanying drawings.

BRIEF DESCRIPTION OF THE DRAWINGS

FIG. 3 is a diagram showing an example of a density correction table showing the actual densities and density correction values for the theoretical densities shown in FIG. 2;

FIG. 4 is a diagram showing an example of a gradation correction table for converting a theoretical gradation value which is managed in a memory medium shown in FIG. 1 to an output gradation value;

FIG. 9 is a diagram for explaining a memory map of the memory medium to store various data processing programs which can be read out by the printing system according to the invention.

DETAILED DESCRIPTION OF THE PREFERRED EMBODIMENTS

First Embodiment

An embodiment will now be described in detail hereinbelow with reference to the drawings.

Figure 1:
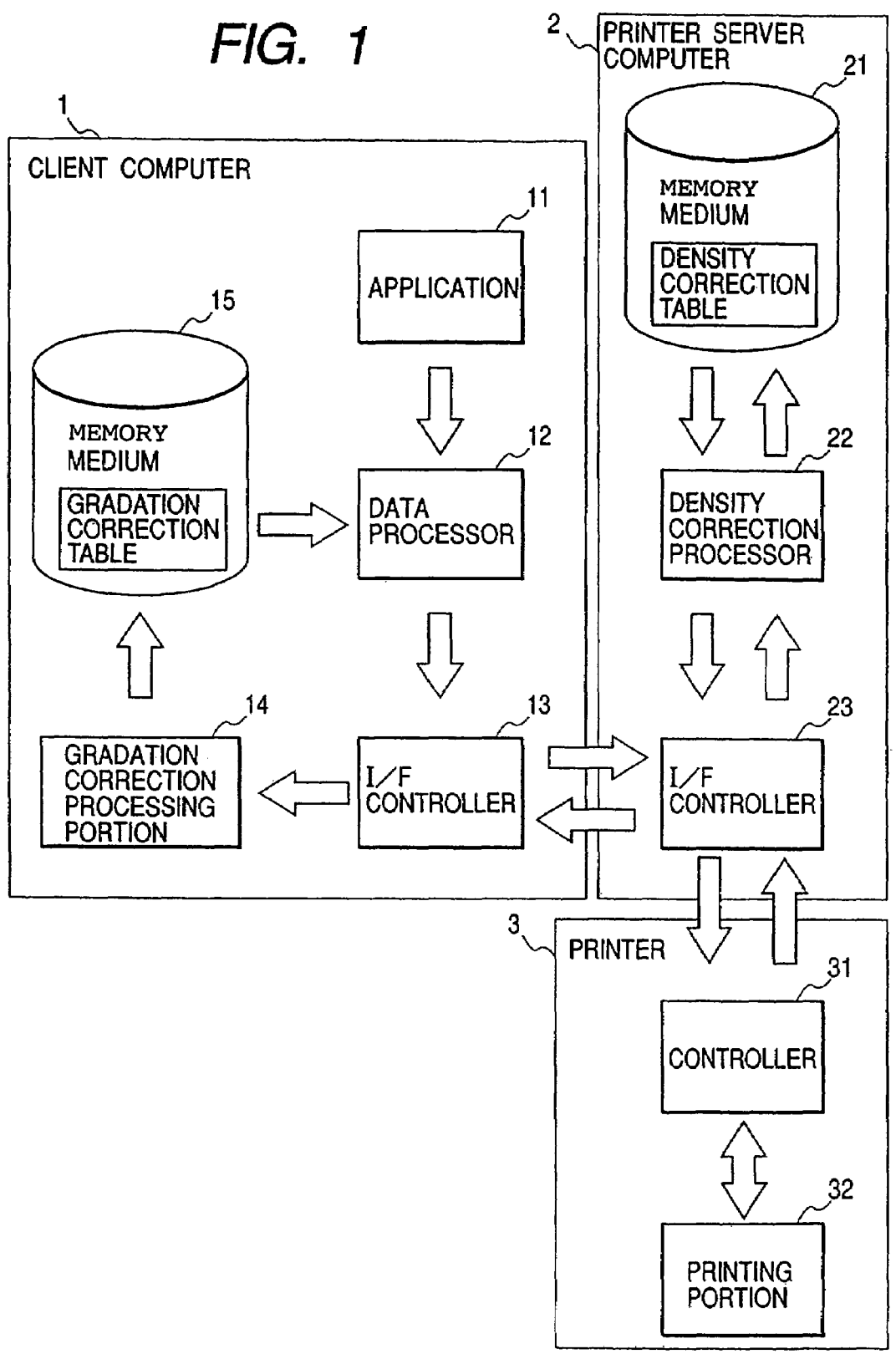
FIG. 1 is a block diagram for explaining a construction of a printing system showing the first embodiment of the invention.

FIG. 1 is a block diagram for explaining a structure of a printing system showing the first embodiment of the invention wherein the printing system and a client computer communicate through a printer server computer, print information obtained by the communication is processed, and the printer server computer outputs print data to a printer.

In the diagram, reference numeral 1 denotes a client computer in printing. The client computer 1 transmits print information comprising print data and control codes to a printer server computer 2. The printer server computer 2 transmits the print information comprising the print data and control codes to a printer 3. The client computer 1, printer server computer 2, and printer 3 mutually perform a bidirectional communication and execute an inputting process of actual density values from the printer 3, an obtaining process of a calibration request, an obtaining process of calibration data, a transmitting and receiving process of a density correction table, and the like.

The printer 3 has a printing mechanism portion to form a desired permanent visible image onto a recording paper, a control portion to control the whole printer, a printer control portion to control a printing mechanism portion, an interface controller to control an interface with the computer, and the like.

In the client computer 1, an application 11 is a software to form desired data by the user. When the operating system (OS) of the client computer 1 is, for example, Windows (trade name), the application 11 also includes a drawing command GDI.

Reference numeral 12 denotes a data processor for forming print data and control codes to output data sent from the application 11 to the printer server computer 2. The data processor 12 converts a theoretical gradation value to an actual gradation value with reference to a gradation correction table which is formed by a gradation correction processing portion 14 as will be explained hereinlater and is stored into a memory medium 15 comprising, for example, a hard disk or another memory medium.

Reference numeral 13 denotes an interface controller for controlling an interface with the printer server computer 2.

Reference numeral 14 denotes the gradation correction processing portion for forming the gradation correction table by obtaining a density correction table from a memory medium 21 which is provided in the printer server computer 2 and in which a density correction table, which will be explained hereinlater, has been stored in response to a printing request.

The memory medium 15 stores the gradation correction table formed by the gradation correction processing portion 14. The formed gradation correction table is referred by the data processor 12.

In the printer server computer 2, reference numeral 23 denotes an interface controller for performing a control of the interface with the client computer 1, performing a control of the interface with the printer 3, and performing a control of a transmission of the print information comprising the print data and control codes to the printer 3 and a reception of the information derived from the printer 3.

Particularly, on the basis of the calibration data from the printer 3, a density correction table, which will be explained hereinlater, is formed every printer by a density correction processor 22 and is stored into the memory medium 21.

In the printer 3, a controller 31 comprises a control portion to control the whole printer, a printer control portion to control the printing mechanism portion, an interface controller to control the interface with the host computer, and the like. When the calibration request and the actual density values are received from a printing portion 32, the controller 31 transmits them as calibration data to the printer server computer 2.

Reference numeral 32 denotes the printing portion having the printing mechanism portion to form a permanent visible image onto a recording paper. When the calibration is necessary, the printing portion 32 outputs data to the printer server computer 2 via the controller 31. When a calibration data output request is received through the controller 31 from the client computer 1 via the printer server computer 2, the printing portion 32 outputs calibration data to the printer server computer 2 through the controller 31. A density value or the like can be mentioned as calibration data.

Figure 2:
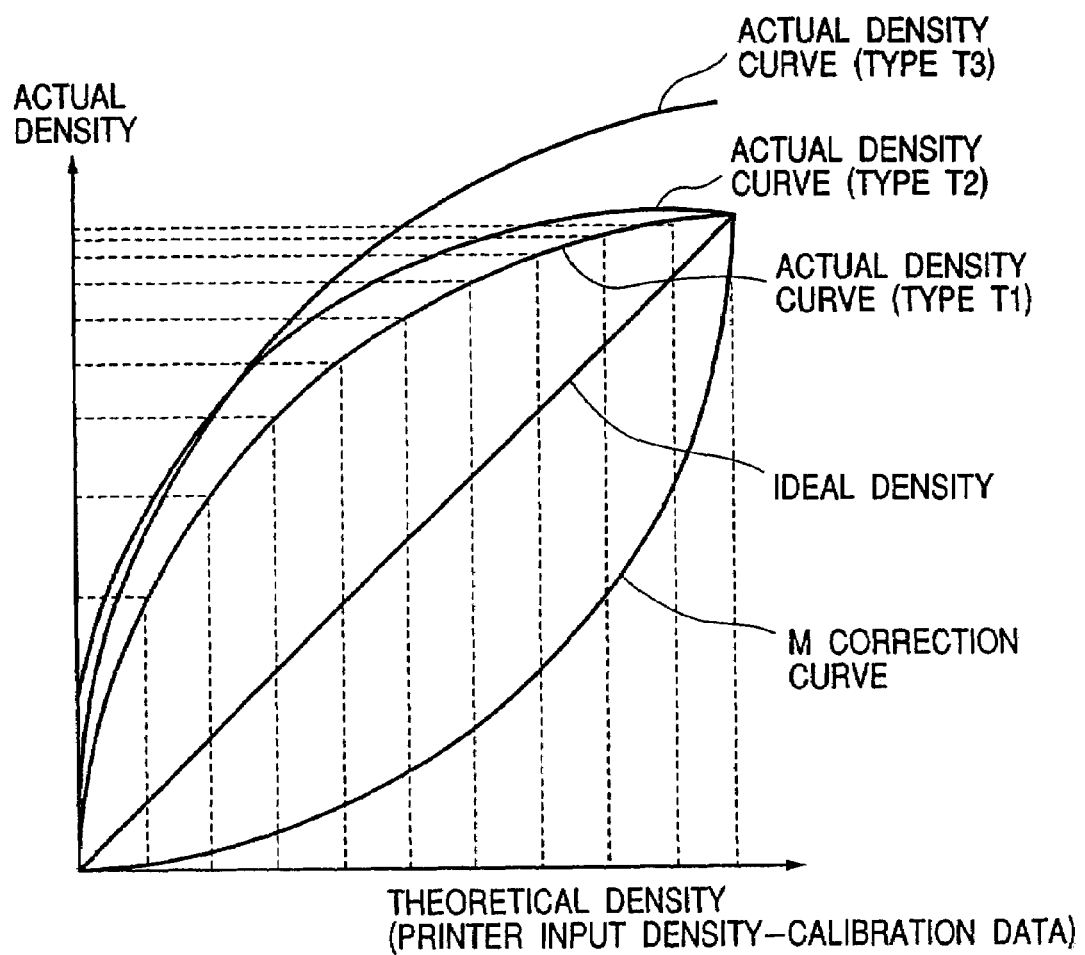
FIG. 2 is a characteristics diagram showing a relation between a theoretical density in a printer shown in FIG. 1 and an actual density of the printer.

FIG. 2 is a characteristics diagram showing a relation between a theoretical density in the printer 3 shown in FIG. 1 and an actual density of the printer. An axis of ordinate indicates the actual density and an axis of abscissa shows the theoretical density, namely, a density value received by the printer 3.

Generally, the desired density value which is sent from the printer server computer 2 to the printer 3, namely, the actual density when a visible image is formed by the printer 3 do not strictly coincide.

A difference between the desired density value and the actual density further increases due to a change in environment and electrical and mechanical factors. An actual density curve differs depending on the printer. Further, even in case of the same printer, the actual density curve also differs in accordance with a use environment and a use situation.

In the diagram, T1 to T3 show actual density curves of different types. A curve in which actual densities are plotted for the theoretical densities is shown as a convex-shaped curve. Particularly, the curve corresponds to characteristics having a tendency such that the intermediate density portion is strongly formed for the theoretical density.

To approximate to an ideal density straight line, namely, a straight line which is inclined upward toward the right at an angle of 45°, it is necessary to correct by a value which is shown by a concave curve for the theoretical density. M denotes a correction curve corresponding to a correction curve for the actual density curve of type T1.

FIG. 3 is a diagram showing an example of the density correction table showing the actual densities and the density correction values for the theoretical densities shown in FIG. 2.

In the diagram, for instance, a density value range of 0 to 100% is divided into ten levels on a 10% unit basis and each level is set to a measurement point. When the theoretical densities are outputted, the density values which are actually formed are input densities (D1 to D10) and become the actual densities.

A value obtained by dividing the theoretical density by the input density is a density correction value and the gradation correction processing portion 14 forms a gradation correction table by using the density correction values. As for a timing to form a gradation correction table TB2 (FIG. 4), when the calibration request is obtained, the theoretical density is outputted to the printer 3, the corresponding actual density is inputted, the density correction value is obtained from the theoretical density and the input density, and the density correction processor 22 forms a density correction table TB1 and stores into the memory medium 21.

FIG. 4 is a diagram showing an example of the gradation correction table which is managed in the memory medium 15 shown in FIG. 1 and is used to convert a theoretical gradation value to an output gradation value.

In the diagram, the gradation correction table TB2 is formed by using the density correction table TB1 shown in FIG. 3. The gradation correction table TB2 is referred when the theoretical gradation value inputted from the application 11 is converted to the output gradation value by the data processor 12. The converted output gradation value is outputted to the printer 3.

Figure 5:
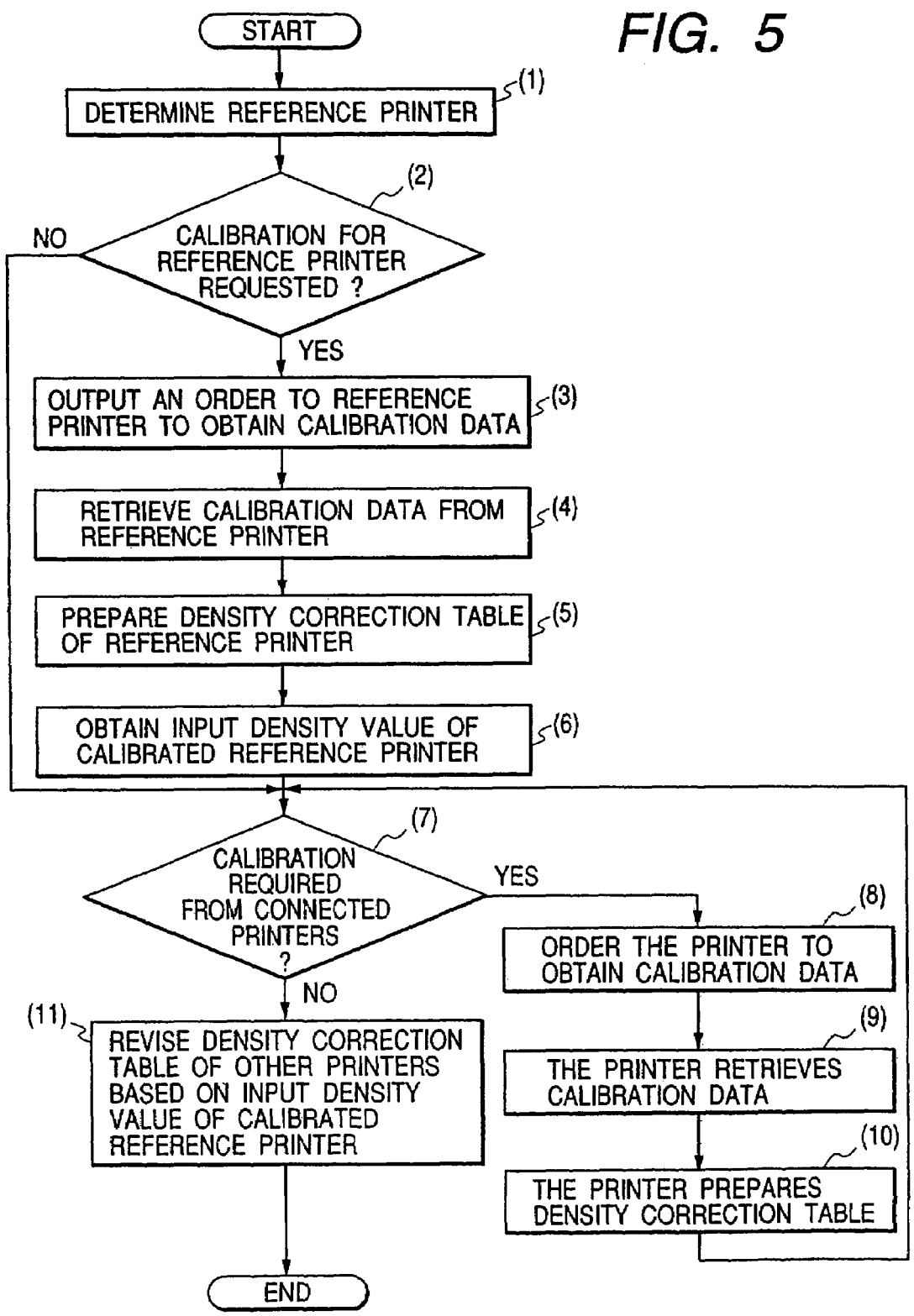
FIG. 5 is a flowchart showing an example of a first data processing procedure in a data processing apparatus according to the invention.

FIG. 5 shows a processing procedure which is executed when the printer server computer receives a calibration revising request. Reference numerals (1) to (11) denote processing steps.

In step (1), a process to set to which printer the color is matched by the setting of the printer server computer or the setting of the client computer in printing. In step (2), a check is made to see if the calibration request has been issued to the reference printer decided in step (1). When it is determined that the request is not issued, step (7) follows. When it is decided that the request has been issued, an order to obtain calibration data is outputted to the reference printer in step (3). Image data corresponding to the theoretical density is outputted to the reference printer. In step (4), the calibration data is obtained from the reference printer. In step (5), the density correction table of the reference printer is formed on the basis of the obtained calibration data.

In step (6), the gradation correction table is formed on the basis of the density correction table formed in step (5), the image data corresponding to the theoretical density is corrected by using the gradation correction table, and the corrected image data is formed by the reference printer. The reference printer outputs the input density obtained by measuring the color of the formed patch to the printer server computer. The server computer forms a table in which the input density and the theoretical density are made correspond and stores it into the memory medium 21.

When the gradation correction table is formed in step (6), a function (not shown) similar to that of the gradation correction processing portion 14 in the printer server computer is used. Similarly, when performing the correction, a function (not shown) similar to that of the data processor 12 is used.

In the calibration processes which are executed in steps (3) to (5), it is important to accurately recognize a current state of an engine portion of the printer. In step (6), on the other hand, it is important to recognize color reproducing characteristics of the whole printer including the correcting process. In step (3), the image data is outputted to the reference printer without correcting. In step (6), by outputting the corrected image data, the calibration process of the reference printer and the process to obtain the input density data of the reference printer which is executed in step (6) can be performed at high precision.

In the calibration process which is executed in the printer, the calibration is performed by using a method as disclosed in JP-A-8-009158 in case of, for example, a printer using the electrophotographic system. That is, a plurality of patches corresponding to the theoretical density are formed every recording material onto a photosensitive drum and the colors of the formed patches are measured, thereby obtaining input densities.

In step (4), the calibration data which is obtained from the reference printer is the input densities derived by measuring the colors of the formed patches.

The calibration process of the printer is not limited to the above method but can be also performed by using any other method.

The timing to perform the calibration is set to a timing when the printer detects a change in state of the self apparatus and a timing when the user instructs the execution of the calibration process.

The timing when the printer detects the change in state of the self apparatus is, for example, a timing when the a predetermined number of images are formed, a timing when an error such as a jam or the like occurs, a timing when a power source is turned on, or the like. In this case, the calibration request is issued from the printer to the printer server computer.

On the other hand, in the case where the user instructs the calibration, the calibration request is issued from the client computer to the printer server computer on the basis of an instruction performed on the GUI of the printer driver on the client computer.

In step (7), a check is made to see if the calibration request has been issued to all of the printers other than the connected reference printer. If it is determined that the calibration request has been generated, step (8) follows and a calibration data obtaining order is outputted to the printer which generated the calibration request. In step (9), the printer which received the calibration data obtaining order forms the latest calibration data on the basis of the input of the actual density or the like and transfers it to the printer server computer 2. In step (10), the printer server computer 2 forms a density correction table of the printer on the basis of the obtained latest calibration data and revises it. When the calibration request is issued from the other printer, similar processing steps are repeated.

When it is decided in step (7) that there is no calibration request from the connected printer, step (11) follows. The density correction value in the density correction table of each printer is revised so that the actual density of each printer is equal to the actual density of the reference printer on the basis of the table of the reference printer made in step (6) and the density correction table of each printer. Specifically speaking, a value obtained by dividing the input density of the reference printer by the input density of each printer is stored into the density correction value of each printer.

When the revising processes of all of the printers are finished, the processing routine is returned. The printer is monitored until the system is finished.

Figure 6:
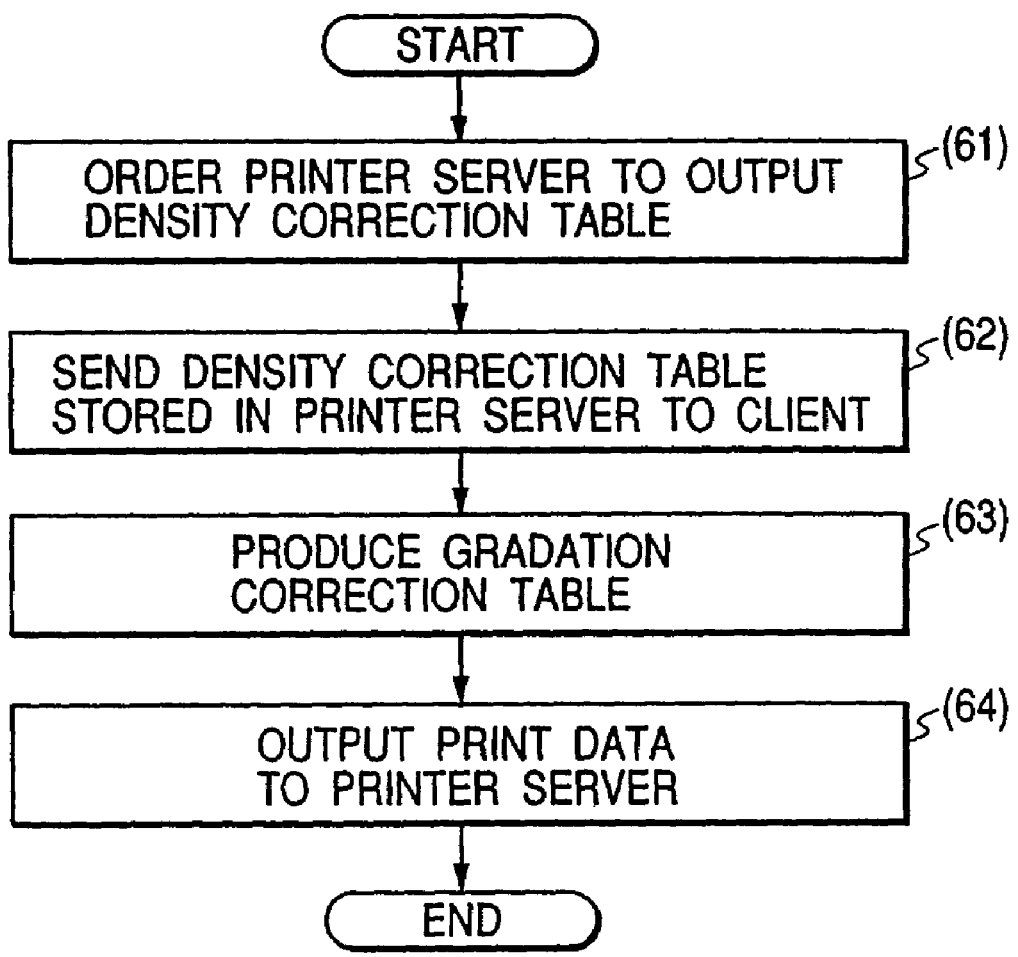
FIG. 6 is a flowchart showing an example of a second data processing procedure in the data processing apparatus according to the invention.

FIG. 6 shows a processing procedure for performing a printing in which the color is matched to the reference printer. Reference numerals (61) to (64) denote processing steps.

When a print command is issued from the client computer 1, in step (61), the client computer 1 issues a density correction table obtaining order to the printer server computer 2 so as to obtain the density correction table stored in the printer server computer 2.

In step (62), the printer server computer 2 transfers the density correction table TB1 stored in the memory medium 21 of the printer server computer 2 to the client computer 1. The client computer 1 subsequently forms the gradation correction table TB2 from the density correction table TB1 in step (63).

In step (64), the print data formed by performing the correction using the gradation correction table TB2 to the input image data is outputted to the printer 3.

Figure 7:
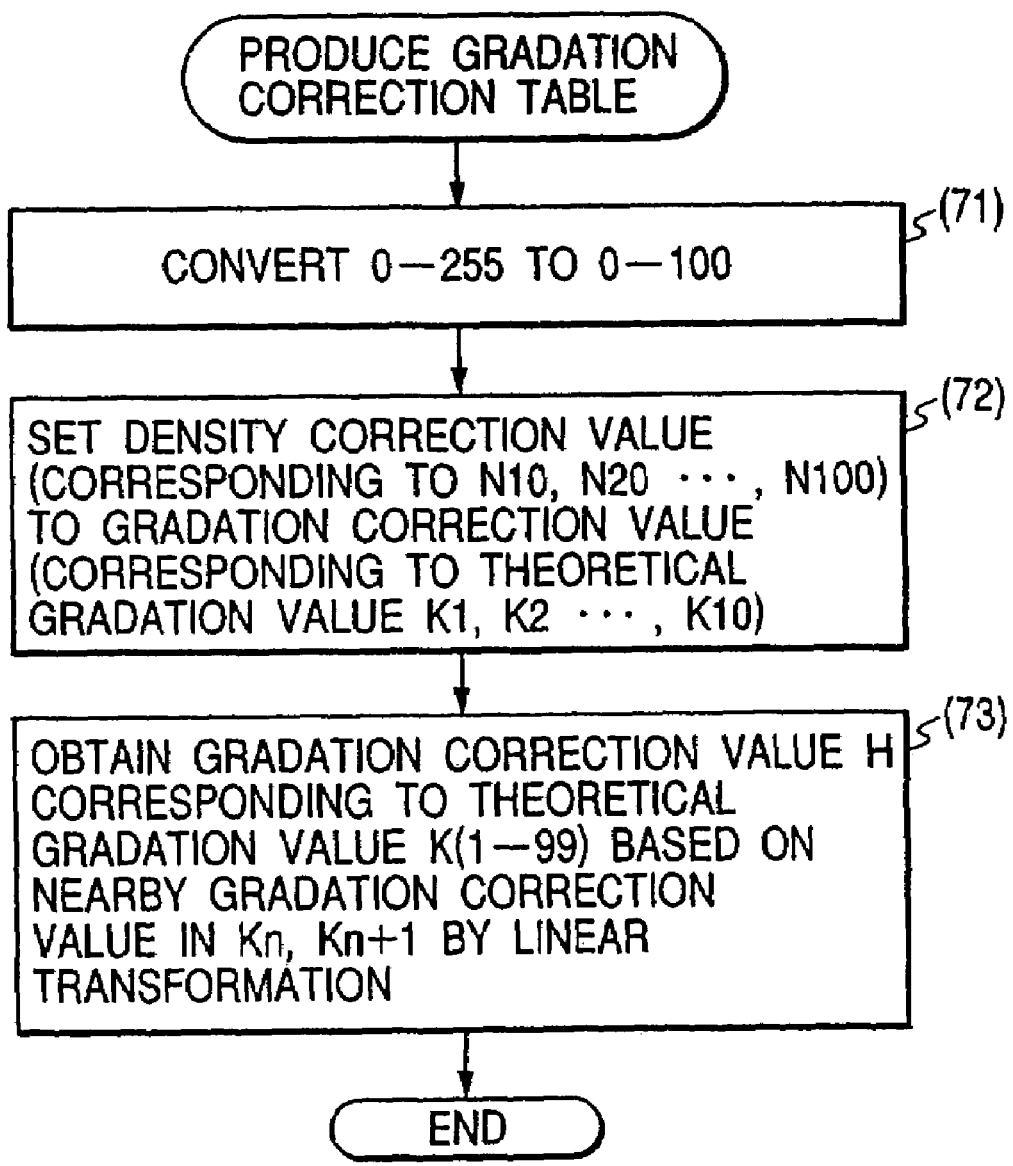
FIG. 7 is a flowchart showing an example of a forming procedure of the gradation correction table based on the density correction table shown in FIG. 3.

FIG. 7 is a flowchart showing an example of a forming procedure of the gradation correction table TB2 based on the density correction table TB1 shown in FIG. 3 and corresponds to the detailed procedure in step (63) shown in FIG. 6. Reference numerals (71) to (73) denote processing steps.

In the transformation from each density correction value in the density correction table TB1 to each gradation correction value in the gradation correction table TB2, with respect to the points where the density correction values are actually measured, namely, the points obtained by dividing the range of 0 to 100 levels on a 10-level unit basis, each density correction value is transformed to each gradation correction value and the other gradation values are obtained from the nearby gradation correction values by the linear transformation.

In step (71), in order to make the theoretical densities "0 to 100" in the density correction table correspond to theoretical gradation values "0 to 255" in the gradation correction table TB2, a transformation of a theoretical gradation value $K=(\text{theoretical density} \times 255)/100$ is calculated.

In subsequent step (72), a table of only a portion of the theoretical gradation values corresponding to the density correction values is formed. The theoretical density in the density correction table TB1 (namely, the density correction values corresponding to 10%, 20%, . . . , 100%) is set into the gradation correction value of the theoretical gradation value corresponding to the theoretical density in the gradation correction table TB2.

A table of the portion of the gradation correction values which do not correspond to the density correction values in the density correction table TB1 is formed in step (73). Now assuming that the theoretical gradation value is set to K and a gradation correction value corresponding to the theoretical gradation value K is set to H, the gradation correction value H is obtained by a linear transformation from a gradation correction value H1 which is smaller than K and is the nearest to K and has been set in step (72) and a gradation correction value H2 which is larger than K and is the nearest to K and has been set in step (72).

That is, the gradation correction value H is obtained by $$H=((H2-H1)/(K2-K1))\times(K-K1)$$

where, K1, K2: theoretical gradation values corresponding to H1 and H2

According to the embodiment, it is possible to freely construct a printing system which can easily unitarily manage the output image characteristics of each printer in a manner such that even if the output image characteristics fluctuate in dependence on the use environment or the like of each printer or any one of the printers is selected or designated from each data processing apparatus, a print result having an almost same picture quality can be obtained.

Particularly, at the time of the calibration in which a possibility such that the color reproducibility of the reference printer changes is large, the density correction table of each printer is revised in accordance with the calibrated color reproducing characteristics of the reference printer, so that a high precise color matching can be always realized without exerting a burden on the user.

The print data to which the gradation correcting process according to the output image characteristics of each printer has been performed on the data processing apparatus side by using the latest density correction table which is managed on the printer server side can be supplied to the printer server. A print result of the same picture quality can be also derived from any one of the printers without exerting a data processing burden on the printer server side.

Second Embodiment

The above first embodiment has been described with respect to the case where the user performs the color matching to an arbitrary printer 3 by the setting of the printer server computer 2 or the setting of the client computer 1 in printing. However, it is also possible to construct so as to match the color to the printer having the best quality in which a deterioration in visible image that is formed due to the change in operation environment of the printer or the electrical and mechanical factors of the printer is small under the environment where a plurality of printers can be used. It is now assumed that as a discrimination reference about the quality, a discrimination result about whether the actual density curve shown in FIG. 2 is close to the ideal density curve or not is used.

In the second embodiment, a process (process corresponding to step (1) in FIG. 5) regarding the decision of the reference printer as a portion different from the first embodiment will now be described with reference to FIG. 8.

In step (81), a user instruction regarding a grouping of a plurality of printers which are managed by the printer server computer is inputted. For example, in the case where the user wants to solely use the printer in the optimized state, it is sufficient to exclude such a printer from the group.

In step (82), the density correction table corresponding to each printer in the same group is read out from the memory medium 21. In step (83), an actual density curve is obtained on the basis of the input densities in the read-out density correction table. On the basis of the actual density curve of each printer, the printer in which the actual density curve is the nearest to the ideal density curve is selected as a reference printer. For example, a difference between the actual density and the ideal actual density value of each printer is obtained with respect to a plurality of representative theoretical densities and the printer in which the total value of the differences is the smallest is selected.

Processes similar to those in the first embodiment are executed to the printers in the same group.

Third Embodiment

The second embodiment has been described with respect to the case where the color matching process of the printer is automated and the color is matched to the printer of the best quality. However, on the contrary, it is also possible to construct so as to match the color to the printer of the worst quality in which the deterioration in quality of a visible image which is formed due to the change in operation environment of the printer or the electrical and mechanical factors of the printer is extremely large under the environment where a plurality of printers can be used.

Fourth Embodiment

The third embodiment has been described with respect to the case of matching the color to the printer having the worst quality when the color matching of the printer is automated. However, there is a case where the color is matched to the printer in which the deterioration in quality of the visible image which is formed is extremely large. In such a case, it is also possible to construct in a manner such that this fact is notified to the user and the control is switched so as to select the color matching printer as shown in the first embodiment.

Fifth Embodiment

The fourth embodiment has been described with respect to the case where although the color is matched to the printer of the worst quality in case of automating the color matching of the printer, in the case where there is the printer in which the deterioration of the quality of the visible image which is formed is extremely large, such a fact is notified to the user and the color matching printer is selected. However, it is also possible to construct in a manner such that the printer whose quality is lower than a predetermined quality reference is ignored and the color matching is performed in the printers which satisfy the predetermined quality reference.

Sixth Embodiment

The sixth embodiment is characterized in that either one of a first mode to perform the color matching process described in each of the above embodiments and a second mode to execute the correcting process using the single optimized gradation correction table can be selected when the printing is instructed by the client computer.

In case of the embodiment, the density correction table formed in step (11) in FIG. 5 and the density correction table formed in step (9) in FIG. 5 are separately stored.

When the first mode is instructed from the client computer, the server computer reads out the density correction table formed in step (11) and transmits it to the client computer. When the second mode is instructed, the server computer reads out the density correction table formed in step (9) and transmits it to the client computer.

According to the embodiment, the proper mode can be selected in accordance with an application of the user and the color reproduction according to the application of the user can be realized.

Other Embodiments

A construction of a data processing program which can be read out by the printing system according to the invention will now be described hereinbelow with reference to a memory map shown in FIG. 9.

FIG. 9 is a diagram for explaining the memory map in the memory medium to store various data processing programs which can be read out by the printing system according to the invention.

Although not particularly shown in the diagram, there is also a case where information to manage a group of programs which are stored in the memory medium, for example, version information, names of the persons who made, and the like are also stored and information depending on the OS or the like on the program reading side, for instance, an icon to identify and display the program and the like are stored.

Further, data depending on the various programs is also managed in a directory. There is also a case where a program to install the various programs into a computer, a program to decompress a program in the case where such a program to install has been compressed, and the like are stored.

Figure 8:
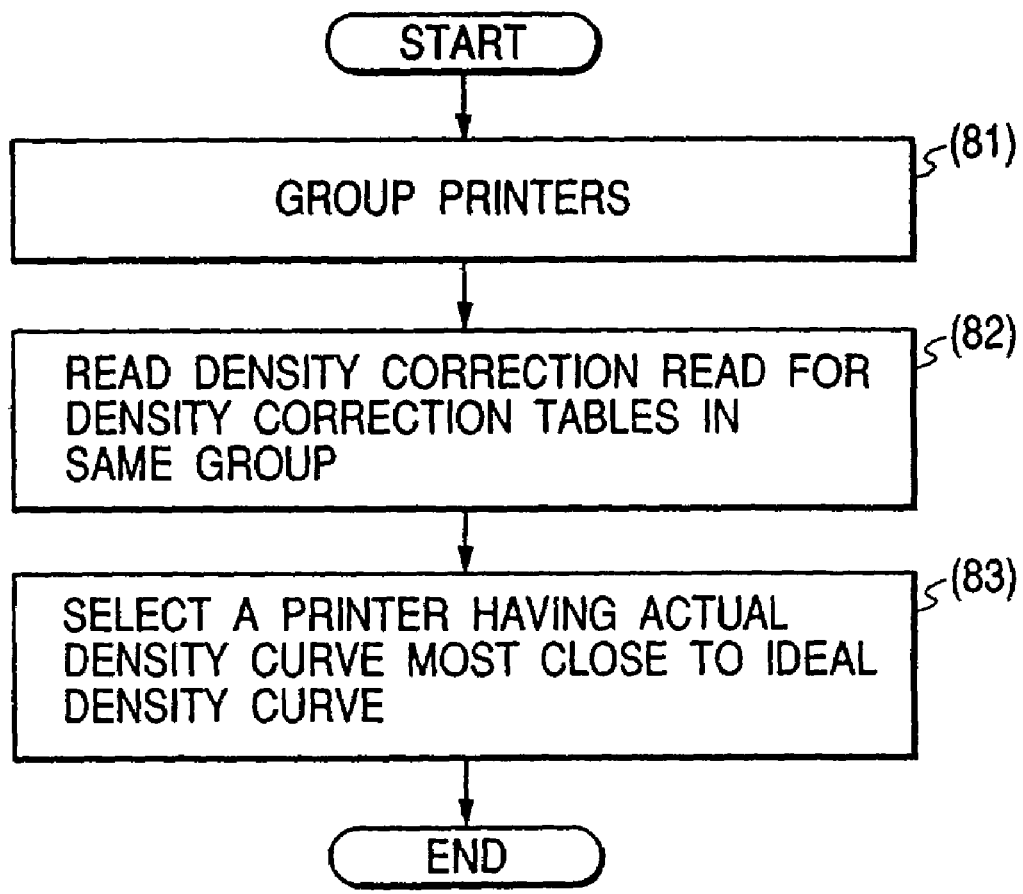
FIG. 8 is a flowchart showing a processing procedure of the second embodiment.

The functions shown in FIGS. 4 and 8 in the embodiment can be also executed by a host computer by a program which is installed from the outside. In such a case, the invention is also applied to a case where an information group including programs is supplied to an output apparatus by a memory medium such as CD-ROM, flash memory, FD, or the like or from an external memory medium through a network.

As mentioned above, the object of the invention can be also obviously accomplished by a method whereby a memory medium in which program codes of software to realize the functions of the foregoing embodiments have been recorded is supplied to a system or apparatus and a computer (or a CPU or MPU) of the system or apparatus reads out and executes the program codes stored in the memory medium.

In this case, the program codes themselves read out from the memory medium realize the novel function of the invention and the memory medium in which the program codes have been stored constructs the invention.

As a memory medium to supply the program codes, for instance, it is possible to use any one of a floppy disk, a hard disk, an optical disk, a magnetooptic disk, a CD-ROM, a CD-R, a magnetic tape, a non-volatile memory card, an ROM, an EEPROM, and the like.

It will be obviously understood that not only a case where the function of the foregoing embodiments is realized by executing the read-out program codes by the computer but also a case where on the basis of an instruction of the program codes, the OS (operating system) or the like which is operating on the computer executes a part or all of the actual processes, and the function of the foregoing embodiments is realized by the processes are also included.

Further, it will be obviously understood that a case where the program codes read out from the memory medium are written into a memory provided for a function expansion board inserted to the computer or a function expanding unit connected to the computer and, after that, on the basis of an instruction of the program code, a CPU or the like provided for the function expansion board or function expanding unit executes a part or all of the actual processes, and the function of the foregoing embodiments is realized by those processes is also included.

The present invention is not limited to the foregoing embodiments but many modifications and variations are possible within the spirit and scope of the appended claims of the invention.

What is claimed is:

1. A processing method in a print system, comprising the steps of:

administrating correction characteristics of plural printers including a reference printer and at least a first printer, wherein the reference printer is a printer which is selected form among the plural printers and set by a client computer included in the print system; and updating the correction characteristics of the first printer in accordance with color reproducibility of the reference printer calibrated based on a value derived by measuring a plurality of patches formed by the reference printer and the correction characteristics based on latest calibration characteristics of the first printer included in the plural printers, in the event that no calibration request, based on a change in status of the first printer, has been generated to the first printer when the reference printer is calibrated, wherein said updating step updates the correction characteristics of the first printer in accordance with a print density value of the first printer without using the color reproducibility of the reference printer calibrated based on the derived value, in the event that a calibration request, based on a change in status of the first printer, has been generated to the first printer when the reference printer is calibrated.

2. A processing method according to claim 1, wherein each of the plural printers performs calibration of the correction characteristics according to a detected change of the state of each of the printers.

3. A processing method according to claim 2, wherein the update in said updating step is performed when there is no execution demand of the calibration.

4. A program, stored on a computer-readable storage medium, for causing a computer to execute a processing method in a print system, said method comprising the steps of:

administrating correction characteristics of plural printers including a reference printer and at least a first printer, wherein the reference printer is a printer which is selected from among the plural printers and set by a client computer included in the print system; and updating the correction characteristics of the first printer in accordance with color reproducibility of the reference printer calibrated based on a value derived by measuring a plurality of patches formed by the reference printer and the correction characteristics based on latest calibrated characteristics of the first printer included in the plural printers, in the event that no calibration request, based on a change in status of the first printer, has been generated to the first printer when the reference printer is calibrated, wherein said updating step updates the correction characteristics of the first printer in accordance with a print density value of the first printer without using the color reproducibility of the reference printer calibrated based on the derived value, in the event that a calibration request, based on a change in status of the first printer, has been generated to the first printer when the reference printer is calibrated.

* * * * *